(12) United States Patent
McMullen

(10) Patent No.: US 8,960,696 B2
(45) Date of Patent: Feb. 24, 2015

(54) STRUT TOP MOUNT WITH MCU AND INTEGRAL TRAVEL LIMITER

(71) Applicant: Zhongli North America Inc., Troy, MI (US)

(72) Inventor: Bryan McMullen, Leonard, MI (US)

(73) Assignee: Zhongli North America Inc., Troy, MI (US)

( * ) Notice: Subject to any disclaimer, the term of this patent is extended or adjusted under 35 U.S.C. 154(b) by 0 days.

(21) Appl. No.: 14/254,126

(22) Filed: Apr. 16, 2014

(65) Prior Publication Data

US 2014/0306419 A1   Oct. 16, 2014

Related U.S. Application Data

(60) Provisional application No. 61/812,426, filed on Apr. 16, 2013.

(51) Int. Cl.
   *B60G 15/00* (2006.01)
   *B60G 15/06* (2006.01)

(52) U.S. Cl.
   CPC .................................. B60G 15/067 (2013.01)
   USPC .................................. 280/124.155; 267/220

(58) Field of Classification Search
   CPC .................. B60G 15/067; B60G 2204/128
   USPC ............... 280/124.147, 124.155; 267/140.13, 267/219, 220
   See application file for complete search history.

(56) References Cited

U.S. PATENT DOCUMENTS

| | | | |
|---|---|---|---|
| 3,037,787 A * | 6/1962 | Gottschald ............. | 280/124.147 |
| 4,290,626 A * | 9/1981 | Sullivan et al. ........ | 280/124.155 |
| 4,478,396 A * | 10/1984 | Kawaura ................ | 267/220 |
| 5,040,775 A * | 8/1991 | Miyakawa .............. | 267/220 |
| 5,088,704 A * | 2/1992 | Kanda .................... | 267/220 |
| 5,251,928 A * | 10/1993 | Maeda ................... | 280/124.155 |
| 5,467,970 A | 11/1995 | Ratu et al. | |
| 5,467,971 A * | 11/1995 | Hurtubise et al. ...... | 267/220 |
| 5,582,394 A * | 12/1996 | Bitschkus et al. ...... | 267/140.13 |
| 5,595,374 A | 1/1997 | Charette et al. | |
| 5,775,720 A * | 7/1998 | Kmiec et al. ........... | 188/322.15 |
| 6,293,572 B1 | 9/2001 | Robbins et al. | |
| 6,394,436 B1 | 5/2002 | Schnaars et al. | |

(Continued)

FOREIGN PATENT DOCUMENTS

| | | |
|---|---|---|
| EP | 0778166 B1 | 11/2001 |
| FR | 2829818 A1 | 3/2003 |
| JP | 2003184937 A | 7/2003 |

*Primary Examiner* — Paul N Dickson
*Assistant Examiner* — Robert A Coker
(74) *Attorney, Agent, or Firm* — Gifford, Krass, Sprinkle, Anderson & Citkowski, P.C.; Douglas L. Wathen

(57) ABSTRACT

A top mount for a suspension damper has a housing with an interior chamber and a damper attachment member disposed in the interior chamber and spaced from the top end and the bottom end. An isolation assembly, formed of MCU, has an upper portion disposed between the member and the top end of the housing and a lower portion disposed between the member and the bottom end of the housing such that the isolation assembly supports the member in the housing. A travel limiter is disposed in the housing and has a first body of resilient material disposed between the member and the top end of the housing and a second body of material disposed between the member and the bottom end of the housing. The isolation assembly is disposed so as to function in parallel to the travel limiter.

10 Claims, 3 Drawing Sheets

(56) References Cited

U.S. PATENT DOCUMENTS

| | | |
|---|---|---|
| 6,419,215 B1 | 7/2002 | Johnson et al. |
| 6,540,216 B2 | 4/2003 | Tousi et al. |
| 6,640,942 B2 * | 11/2003 | Wakita .................... 188/321.11 |
| 6,908,076 B2 * | 6/2005 | Hayashi et al. ............... 267/220 |
| 7,347,414 B2 * | 3/2008 | Groves .......................... 267/220 |
| 7,350,779 B2 * | 4/2008 | Tamura ........................ 267/220 |
| 7,503,552 B2 | 3/2009 | Huprikar et al. |
| 7,938,418 B1 | 5/2011 | Coombs et al. |
| 8,167,283 B2 | 5/2012 | Huprikar et al. |
| 8,333,269 B2 | 12/2012 | Dickson et al. |
| 2002/0079630 A1 * | 6/2002 | Bachmeyer et al. ..... 267/140.13 |
| 2003/0178269 A1 * | 9/2003 | Hayashi et al. .......... 188/321.11 |
| 2005/0012256 A1 | 1/2005 | Huprikar et al. |
| 2005/0155829 A1 * | 7/2005 | Germano et al. ........ 188/321.11 |
| 2005/0280195 A1 | 12/2005 | Huprikar et al. |
| 2006/0151928 A1 * | 7/2006 | Tamura ........................ 267/219 |
| 2006/0279031 A1 | 12/2006 | Schleck et al. |
| 2007/0001358 A1 | 1/2007 | Cummings et al. |
| 2009/0020930 A1 | 1/2009 | Wirges |
| 2012/0193852 A1 * | 8/2012 | Thye-Moormann .......... 267/292 |
| 2014/0070512 A1 * | 3/2014 | Wilson .................. 280/124.155 |

* cited by examiner

STRUT TOP MOUNT WITH MCU AND INTEGRAL TRAVEL LIMITER

CROSS REFERENCE TO RELATED APPLICATION

This application claims priority to U.S. provisional patent application Ser. No. 61/812,426, filed Apr. 16, 2013, the contents of which is incorporated herein in its entirety.

FIELD OF THE INVENTION

The present invention relates generally to suspension components and, more specifically, to an isolation mount for the top of a suspension strut or shock absorber.

BACKGROUND OF THE INVENTION

Transportation vehicles typically include a suspension system that allows the wheels and tires of the vehicle to move relative to the body or frame of the vehicle. Springs are provided to support the weight of the vehicle and dampers are provided to dampen the motion of the suspension components. The damper typically takes a form of a strut or shock absorber and this strut or shock absorber is interconnected with the body or frame of the vehicle by a top mount. In the simplest designs, this top mount may be a solid structure. However, it is desirable that the top mount include some type of isolation arrangement to address NVH (noise, vibration, and harshness) issues and to assist in tuning of the vehicle suspension.

In some top mount designs, the upper part of the strut or shock absorber connects to an inner metal plate shaped like a large washer and this plate is positioned inside of a metal housing with the housing connected to the vehicle body or frame. A resilient material is provided between the plate and the housing to provide isolation. The resilient material is typically rubber though other materials are sometimes used. The resilient material acts as both a spring and a damper between the plate and the housing.

It is desirable that a top mount be very durable, lasting the entire life of the vehicle. At the same time, it is desirable that the spring rate and damping rate exhibited by the resilient material in the top mount remain within a specified range for as long as possible. Often, these design goals are in opposition. In order to achieve a desired combination of spring and damping rate in the isolation material, a very soft material may be used. However, this soft material may not provide the necessary durability.

It is known to use MCU (microcellular urethane) as a resilient material for a variety of applications. MCU is a urethane that has small "microcellular" bubbles or voids in the body of urethane material. The type of urethane and the quantity and size of the microcellular voids may be chosen so as to provide a desirable combination of spring rate and damping rate. However, MCU does not tolerate high loads. If a body of MCU is exposed to a compression load above a certain level, the MCU is irreparably damaged and the spring rate and/or damping rate is modified. This makes the use of MCU in suspension components such as top mounts difficult, since these components may see very high loads when the suspension experiences a large impact from rough roads or off-road use. If the MCU composition is chosen so as to provide the desired characteristics under normal suspension inputs, corresponding to roads that are smooth or have moderate irregularities, this composition may not tolerate the higher loads that the vehicle may periodically experience.

SUMMARY OF THE INVENTION

The present invention provides several designs for a top mount using MCU as an isolator and having an integral travel limiter that seeks to prevent overloading of the MCU isolator. In a first embodiment, a top mount for a suspension damper has a housing with an interior chamber extending between a top end and a bottom end. A damper attachment member disposed in the interior chamber and spaced from the top end and the bottom end. An isolation assembly, formed of MCU, has an upper portion disposed between the member and the top end of the housing and a lower portion disposed between the member and the bottom end of the housing such that the isolation assembly supports the member in the housing. A travel limiter is disposed in the housing and has a first body of resilient material disposed between the member and the top end of the housing and a second body of material disposed between the member and the bottom end of the housing. The isolation assembly is disposed so as to function in parallel to the travel limiter.

In certain versions, the upper portion of the isolation assembly contacts the member and the top end of the housing and the lower portion of the isolation assembly contacts the member and the bottom end of the housing. The first body of resilient material of the travel limiter extends only part way between the member and the top end of the housing and the second body of resilient material of the travel limiter extends only part way between the member and the bottom end of the housing. The isolation assembly supports the member in a neutral position when a load is not applied to the member and the member moves upwardly or downwardly when the member is subjected to an upwardly or downwardly load. A first gap is defined between the first body of resilient material of the travel limiter and the top end of the housing and a second gap is defined between the second body of resilient material of the travel limiter and the bottom end of the housing when the member is in a neutral position.

In certain versions, each portion of the isolation assembly comprises a body of MCU with holes defined therein and the travel limiters are each a body of material disposed in one of the holes of the isolation assembly. Each of the holes may extend through the portion of isolation material from the member to an outer surface of the portion and the travel limiters may at least partially fill the holes.

In certain versions, the damper attachment member is disc shaped with a central opening for receiving an end of a suspension damper and the upper and lower portions of the isolation assembly are each generally annular in shape. The first and second bodies of resilient material of the travel limiter may be attached to the damper attachment member outboard of the isolation assembly.

In some versions, the travel limiter is not formed of MCU. The travel limiter may be formed of rubber or a rubber blend.

In certain versions, the housing comprises a housing portion and a cap portion. The housing portion has a closed first end and an open second end, the cap portion being received in the second end of the housing portion.

DETAILED DESCRIPTION OF THE INVENTION

The present invention provides several designs for a top mount using MCU as an isolator and having an integral travel limiter that seeks to prevent overloading of the MCU isolator. Generally, these designs include a travel limiter that acts in parallel to the MCU isolator. For example, the travel limiter may be formed of a resilient material that is stiffer than the MCU and is connected to the inner plate or washer in the top mount and spaced from the housing. Under normal suspension loads, the MCU isolator is displaced and the travel limiter does not contact the housing. Under larger loads, the MCU isolator is compressed until the travel limiter contacts the housing. At this point, the stiffer travel limiter significantly increases the spring rate of the top mount and prevents excess displacement of the MCU isolator. It should be understood that the designs illustrated herein are merely representative of a plurality of such designs. Further, terms such as top, bottom, upper, and lower are used merely to refer to various portions of the top mount as illustrated herein, but are not limiting on the actual configuration.

Figure 1A:
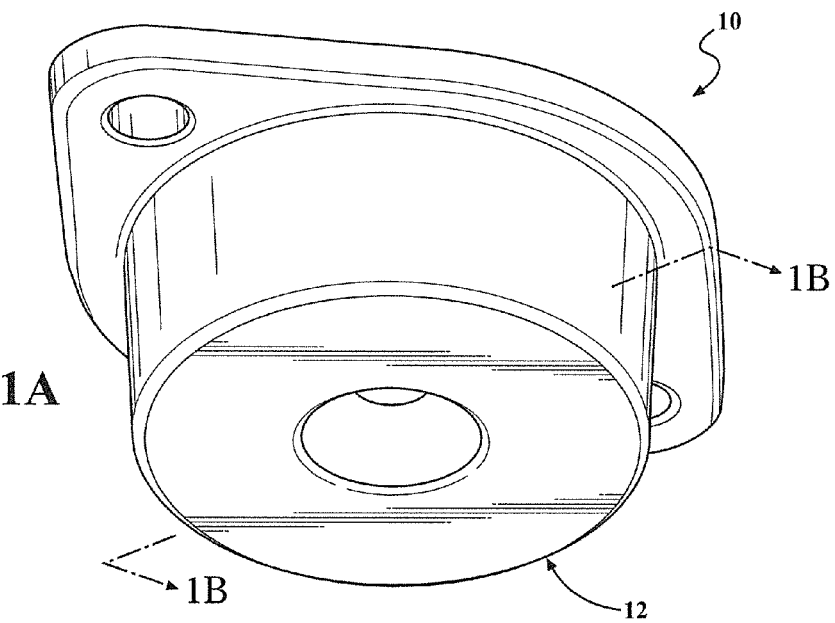
FIG. 1A is a perspective view of a first embodiment of a top mount in accordance with the present invention.
Figure 1B:
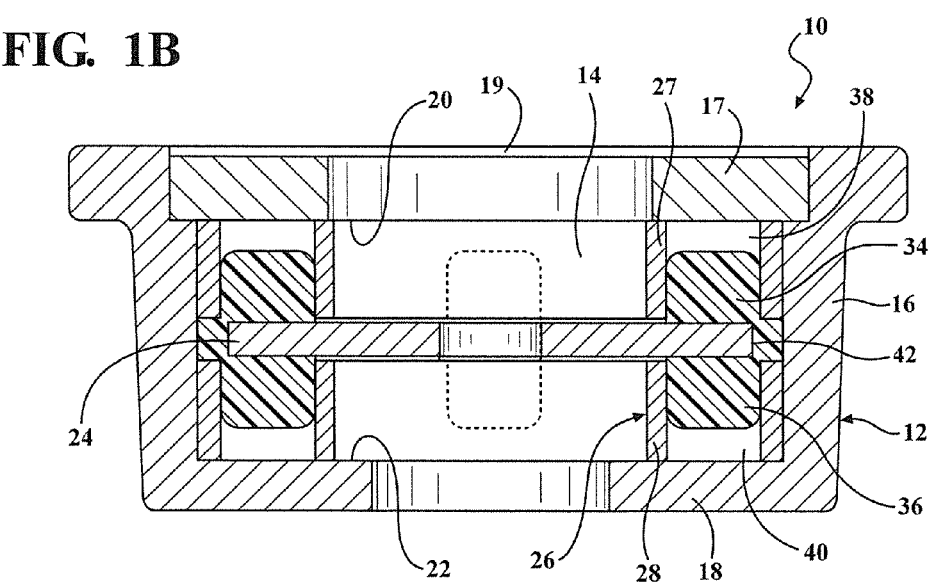
FIG. 1B is a cross sectional view of the top mount of FIG. 1A, taken along lines 1B-1B.

Referring to FIGS. 1A and 1B, a first embodiment of a top mount 10 is shown in a perspective view and cross sectional view, respectively. The top mount includes a housing 12 that may be said to enclose an interior chamber 14. As will be clear to those of skill in the art, the housing may take a wide variety of forms depending on the application. In the illustrated embodiment, the housing 12 has a cup-shaped housing portion 16 and a cap or top plate 17. The housing portion 16 may be said to have a closed lower end 18 and an open upper end 19 with the cap 17 received in the upper end 19 so as to enclose the interior chamber 14. The housing may be formed in other ways. The cup-shaped housing portion 16 and cap 17 may be formed by casting, weldment, stamping, molding, machining, or in other ways known to those of skill in the art.

The interior chamber 14 may be said to have a top end 20 defined by a lower surface of the cap 17 and a bottom end 22 defined by an inner surface of the lower end 18 of the housing portion 16. A damper attachment member 24 is disposed in the interior chamber 14 and spaced from both the top end 20 and bottom end 22. An isolation assembly 26 has an upper portion 27 disposed between the attachment member 24 and the upper end 20 and a lower portion 28 disposed between the member 24 and the bottom end 22 of the housing such that the isolation assembly 26 supports the attachment member 24 within the housing.

Figure 2A:
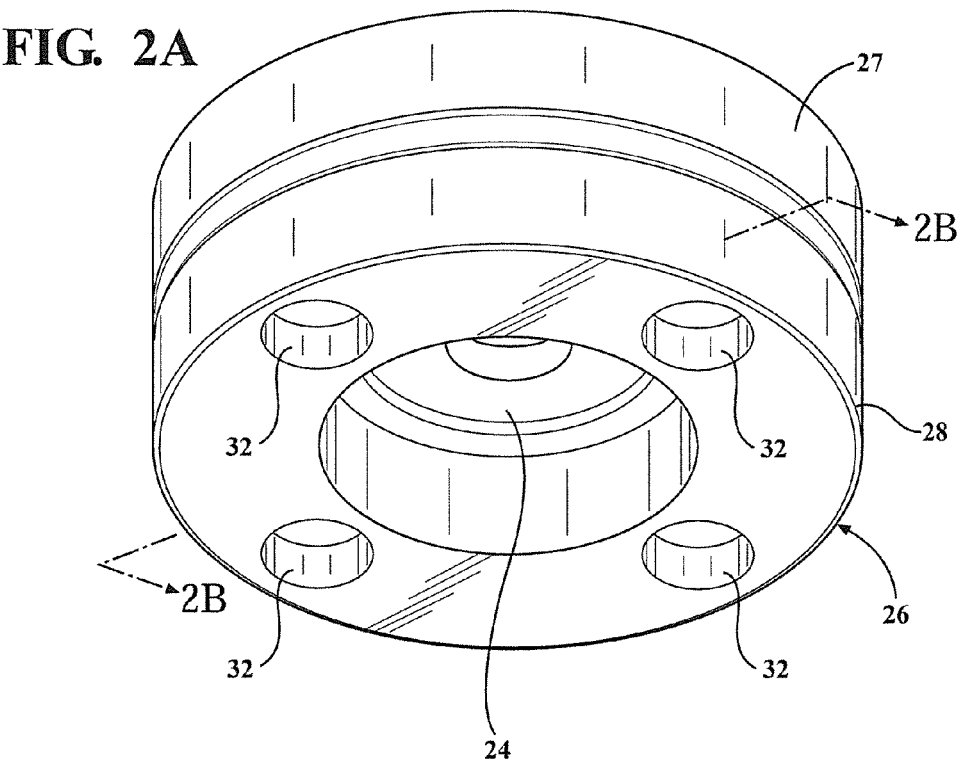
FIG. 2A is a perspective view of internal portions of the top mount of FIGS. 1A and 1B.
Figure 2B:
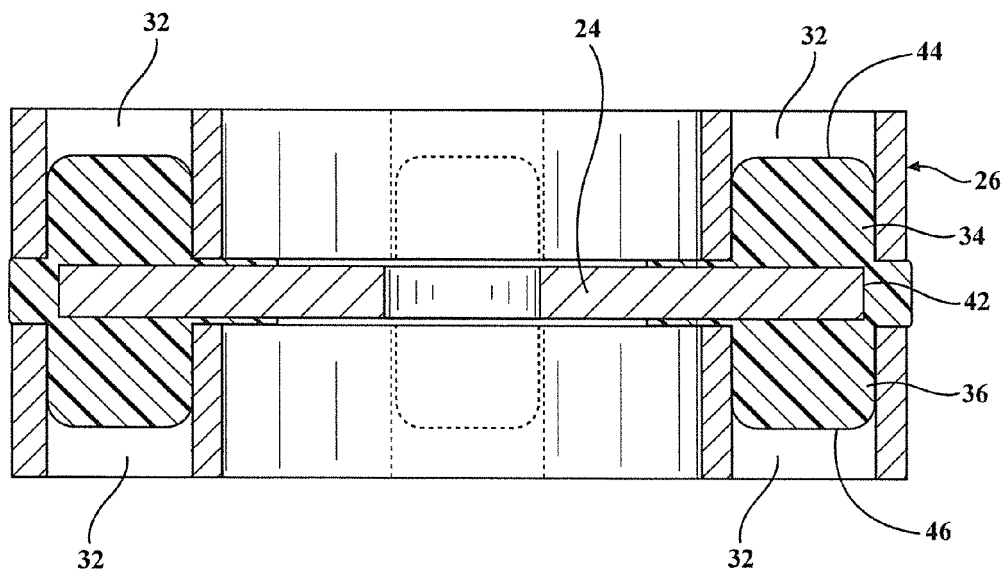
FIG. 2B is a cross sectional view of the internal portions of FIG. 2A, taken along lines 2B-2B.

The attachment member 24 and isolation assembly 26 together form what may be called an inner assembly. This inner assembly 30 is shown in FIGS. 2A and 2B and will be discussed in more detail. Again, the attachment member is shown at 24 and the isolation assembly is shown at 26. The upper portion of the isolation assembly 26 is indicated at 27 and the lower portion is indicated at 28. The upper and lower portions are each ring-shaped bodies of MCU that extend between the attachment member 24 and the respective portions of the housing. As shown, the upper portion 27 contacts both the attachment member 24 and the top end 20 of the housing and the lower portion 28 contacts both the attachment member 24 and the bottom end of the housing. As such, the member is maintained in its position without any play. When no load is applied to the attachment member 24, the isolation assembly 26 supports the member in a neutral position.

In the illustrated embodiment, the upper portion 27 and lower portion 28 each have four openings 32 defined therein. These openings generally extend between the outer surfaces of the portions 27 and 28 and the attachment member 24. Preferred embodiments of the present invention further include a travel limiter that seeks to avoid overloading the MCU isolation assembly 26. In the illustrated embodiment, the travel limiter takes the form of resilient material disposed in the holes 32, connected to the attachment member 24 and spaced from the housing. The travel limiter may be said to have a first body of resilient material 34 attached to one side of the attachment member 24 and a second body of resilient material 36 attached to the other side of the attachment member 24. Referring again to FIG. 1, the bodies of resilient material 34, 36 are spaced from the top end 20 and bottom end 22, respectively, by air gaps 38 and 40, respectively. In the illustrated embodiment, the travel limiter includes bodies of material in each of the four holes in the upper and lower portion of the isolation assembly.

As will be clear to those of skill in the art, when a small or moderate load is applied between the attachment member 24 and the housing 12, the MCU isolation assembly 26 will allow some relative motion by compressing one of the portions 27 or 28. This will reduce or expand the air gaps 38 and 40 but will not cause the bodies 34 and 36 to contact the ends 20 and 22. At higher loads, the MCU isolation assembly 26 will allow the attachment member 24 to displace sufficiently that one of the bodies of material 34 or 36 will contact the respective end 20 or 22 of the housing. Preferably, the bodies of resilient material 34 and 36 are formed of a material that is stiffer than the MCU, such as rubber, rubber blend, TPE (thermoplastic elastomer), TPU (thermoplastic urethane), plastic, or other materials. At this point, the load will be shared between the MCU isolation assembly and the travel limiter, acting in parallel. Additional travel of the attachment member 24 relative to the housing will be limited. The shape, configuration, dimensions, and materials of the isolation assembly and travel limiter may be chosen so as to prevent the MCU isolation assembly from experiencing excess loading, thereby allowing the MCU isolation assembly to continue performing with a desired spring rate and damping rate under normal loads.

In some versions, the material forming the travel limiters 34 and 36 may also cover additional portions of the attachment member. For example, molded rubber may cover the attachment member 24 with the MCU isolation assembly attached thereto. However, the rubber in this example is a thin layer and may be present due to the way in which a top mount may be formed. First, the rubber portions are over molded onto the attachment member 24 and then the MCU isolation assembly is over molded to the attachment member with the rubber thereon. As shown, the rubber may also extend outwardly beyond the outer perimeter 42 of the attachment member 24 and provide an interconnection between the outermost portion of the isolation assembly 26 and the attachment member 24. The portion of rubber between the MCU isolation assembly and the attachment member 24 may be considered part of the attachment member in some embodiments. Further embodiments may have more or fewer holes in the MCU for the travel limiters, and the holes may be shaped or arranged differently.

In the illustrated embodiment, the travel limiters 34 and 36 are shown as having generally flat outer faces 44 and 46, respectively. In alternative versions, the travel limiters 34 and 36 may be generally cone shaped, have cone shaped outer faces 44 and 46, and/or rubber voids in surfaces 44 & 46 such that the effective spring rate of the top mount changes more gradually as the travel limiter contacts the housing. Further embodiments may have more or fewer holes in the MCU for the travel limiters, and the holes may be shaped or arranged differently than illustrated.

In the illustrated embodiment, the MCU isolation assembly and the travel limiter are both shown as symmetrical with respect to the attachment member 24. That is, they have the same thickness on both sides of the attachment member. Alternatively, either or both of the isolation assembly and travel limiters may be nonsymmetrical. For example, the travel limiter may be thicker on the top or bottom side of the attachment member than on the opposite side so as to provide differing amounts of travel limit on the two sides.

In an alternative embodiment, the travel limiters are instead attached to the housing and spaced from the attachment member 24. That is, the travel limiters are attached to the housing at the top end 20 and bottom end 22 and extend inwardly towards the attachment member 24. As will be clear to those of skill in the art, this will provide a similar function.

Figure 3:
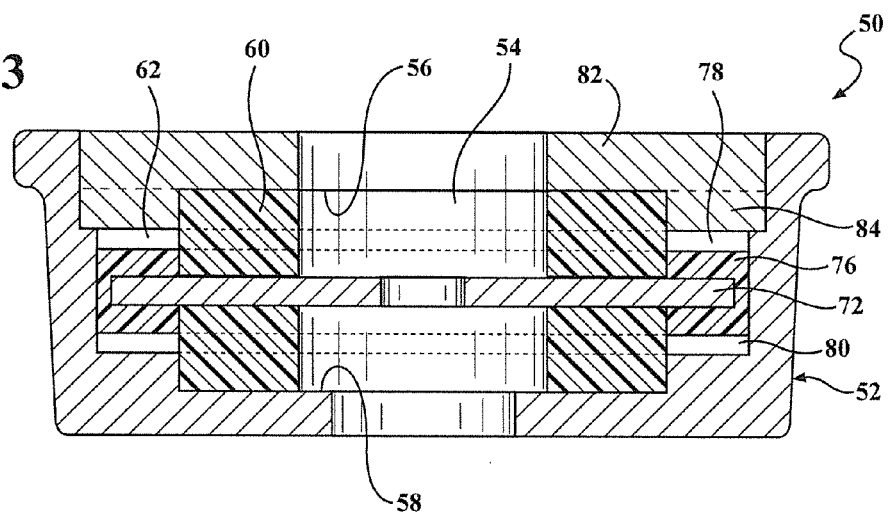
FIG. 3 is a cross sectional view of an alternative embodiment of a top mount in accordance with the present invention.
Figure 4:
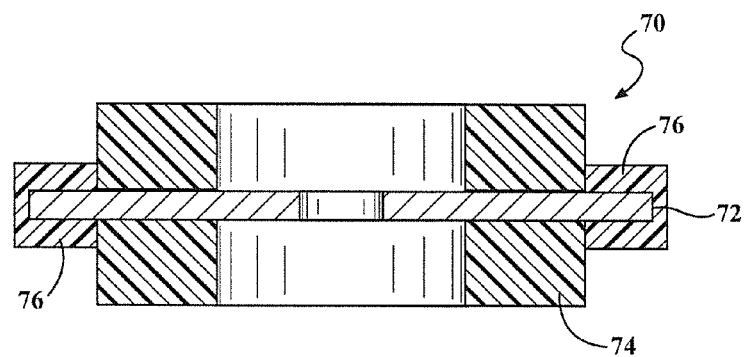
FIG. 4 is a cross sectional view of internal portions of the top mount of FIG. 3.

Referring now to FIG. 3, a second embodiment of a top mount 50 is shown. The top mount 50 includes a similar housing 52 with an interior chamber 54. In the illustrated embodiment, the top end 56 and bottom end 58 are stepped, unlike the prior embodiment. The interior chamber 54 may be said to have an inner portion 60 and an outer portion 62 with the outer portion 62 being radially outboard of the inner portion 60. As shown, the distance between the top end 56 and bottom end 58 is greater in the inner portion 60 than in the outer portion 62. FIG. 4 shows the inner assembly 70 for use with the housing 52. The inner assembly 70 includes an attachment member 72 and an MCU isolation assembly 74. As best shown in FIG. 3, the isolation assembly 74 extends completely between the attachment member 72 and the top end 56 and bottom end 58 of the housing such that the isolation assembly 74 supports the attachment member 72 in the housing. The isolation assembly is again ring shaped and in this embodiment has an outer diameter corresponding to the outer diameter of the inner portion 60 of the interior chamber 54.

A travel limiter 76 is connected to the attachment member 72 and is radially outboard of the isolation assembly 74. Again, the travel limiter 76 is preferably formed of a resilient material that is stiffer than the MCU, such as rubber. As best shown in FIG. 3, the travel limiter 76 is disposed in the outer portion 62 of the interior chamber 54 and is spaced from the upper end 56 and lower end 58 by air gaps 78 and 80, respectively. As will be clear to those of skill in the art, the embodiment of FIGS. 3 and 4 functions similar to the embodiment of FIGS. 1 and 2. In the illustrated embodiment, the cap 82 of the housing 52 has a downward stepped portion 84 that defines the reduced height outer portion 62. This cap may be one piece or two pieces. In an alternative version, the chamber is not stepped and the travel limiter is thicker so as to provide a similar air gap. Again, the illustrated embodiment may be altered in various ways, such as changing the shape.

Figure 5:
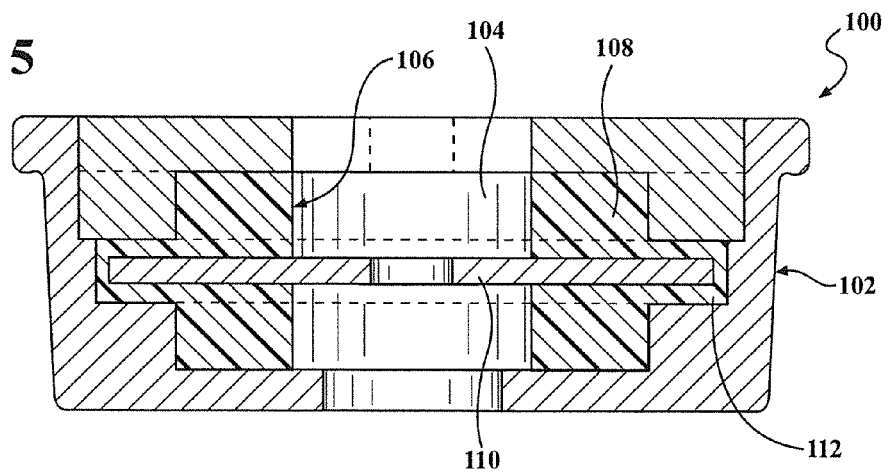
FIG. 5 is a cross sectional view of a further alternative embodiment of a top mount in accordance with the present invention.

Referring now to FIG. 5, a third embodiment of a top mount is shown at 100 having a housing 102 enclosing an interior chamber 104. The interior chamber 104 is shaped similarly to the embodiment of FIGS. 3 and 4 but the outer portion has a further reduced height. The inner assembly is shown at 106. As with the prior embodiment, the inner assembly has an MCU isolation assembly 108 interconnected with the attachment member 110 and extending entirely between the top and bottom ends of the housing 102. In this embodiment, the travel limiter 112 is again outboard of the isolation assembly 108, but in this embodiment the travel limiter 112 is formed of MCU. As shown, the travel limiter 112 has a thickness substantially less than the isolation assembly 108. As shown in FIG. 5, the travel limiter 112 is disposed in the outer portion of the interior chamber 104. In the illustrated embodiment, no air gap is provided between the travel limiter and the top and bottom ends of the interior chamber 104.

As will be clear to those of skill in the art, the herein illustrated and discussed embodiments of the present invention may be altered in various ways without departing from the scope or teaching of the present invention. It is the following claims, including all equivalents, which define the scope of the present invention.

The invention claimed is:

1. A top mount for a suspension damper, the top mount comprising:
   a housing having an interior chamber extending between a top end and a bottom end;
   a damper attachment member disposed in the interior chamber and spaced from the top end and the bottom end;
   an isolation assembly having an upper portion disposed between the member and the top end of the housing and a lower portion disposed between the member and the bottom end of the housing such that the isolation assembly supports the member in the housing;
   a travel limiter disposed in the housing, the travel limiter including a first body of resilient material disposed between the member and the top end of the housing and a second body of material disposed between the member and the bottom end of the housing;
   wherein the isolation assembly is formed of microcellular urethane (MCU); and
   wherein the isolation assembly is disposed so as to function in parallel to the travel limiter.

2. A top mount in accordance with claim 1, wherein:
   the upper portion of the isolation assembly contacts the member and the top end of the housing;
   the lower portion of the isolation assembly contacts the member and the bottom end of the housing;
   the first body of resilient material of the travel limiter extends only part way between the member and the top end of the housing; and
   the second body of resilient material of the travel limiter extends only part way between the member and the bottom end of the housing.

3. A top mount in accordance with claim 2, wherein:
   the isolation assembly supports the member in a neutral position when a load is not applied to the member and the member moves upwardly or downwardly when the member is subjected to an upwardly or downwardly load; and
   wherein a first gap is defined between the first body of resilient material of the travel limiter and the top end of the housing and a second gap is defined between the second body of resilient material of the travel limiter and the bottom end of the housing when the member is in a neutral position.

4. A top mount in accordance with claim 1, wherein:
each portion of the isolation assembly comprises a body of MCU with holes defined therein; and
the travel limiters are each a body of material disposed in one of the holes of the isolation assembly.

5. A top mount in accordance with claim 4, wherein each of the holes extends through the portion of isolation material from the member to an outer surface of the portion; and
the travel limiters at least partially fill the holes.

6. A top mount in accordance with claim 1, wherein:
the damper attachment member is disc shaped with a central opening for receiving an end of a suspension damper; and
the upper and lower portions of the isolation assembly each being generally ring-shaped.

7. A top mount in accordance with claim 6, wherein the first and second bodies of resilient material of the travel limiter are attached to the damper attachment member outboard of the isolation assembly.

8. A top mount in accordance with claim 1, wherein:
the travel limiter is not formed of MCU.

9. A top mount in accordance with claim 8, wherein:
the travel limiter is formed of rubber or a rubber blend.

10. A top mount in accordance with claim 1, wherein:
the housing comprises a housing portion and a cap portion, the housing portion having a closed first end and an open second end, the cap portion being received in the second end of the housing portion.

\* \* \* \* \*